(12) United States Patent
Zolli

(10) Patent No.: US 9,396,472 B2
(45) Date of Patent: Jul. 19, 2016

(54) SYSTEMS AND METHODS FOR DYNAMICALLY IDENTIFYING ILLEGITIMATE ACCOUNTS BASED ON RULES

(71) Applicant: Facebook, Inc., Menlo Park, CA (US)

(72) Inventor: Michael Francis Zolli, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/529,713

(22) Filed: Oct. 31, 2014

(65) Prior Publication Data

US 2016/0125424 A1    May 5, 2016

(51) Int. Cl.
*G06Q 40/00*    (2012.01)
*G06Q 30/00*    (2012.01)

(52) U.S. Cl.
CPC ............ *G06Q 30/0185* (2013.01); *G06Q 40/12* (2013.12)

(58) Field of Classification Search
CPC .......................... G06Q 20/4016; H04M 15/47
USPC ...................... 235/379, 380, 382; 379/114.14
See application file for complete search history.

(56) References Cited

U.S. PATENT DOCUMENTS 5,819,226 A * 10/1998 Gopinathan ........... G06Q 20/00
705/44

* cited by examiner

*Primary Examiner* — Jamara Franklin
(74) *Attorney, Agent, or Firm* — Sheppard Mullin Richter & Hampton LLP

(57) ABSTRACT

Systems, methods, and non-transitory computer-readable media can receive a set of accounts associated with a specified time frame. One or more features and one or more feature combinations can be analyzed for each account in the set. Feature metrics for the one or more features and the one or more feature combinations can be determined for each account in the set. Threshold values for the feature metrics can be acquired. At least one rule can be implemented based on at least some of the feature metrics and at least some of the threshold values.

17 Claims, 12 Drawing Sheets

SYSTEMS AND METHODS FOR DYNAMICALLY IDENTIFYING ILLEGITIMATE ACCOUNTS BASED ON RULES

FIELD OF THE INVENTION

The present technology relates to identifying illegitimate accounts. More particularly, the present technology relates to techniques for dynamically identifying illegitimate accounts based on rules.

BACKGROUND

Today, people often interact with networked environments or online services. Many users of computing devices (or systems) frequently browse web sites, access online media content, or otherwise use network services. Users with access to the Internet can perform online shopping, watch streaming movies, download software, utilize social networking services, and accomplish many other tasks. In one example, users of a social networking service or system can publish advertisements, purchase applications, give gifts, distribute promotions, or conduct various other transactions. Sometimes, an illegitimate user can attempt to publish illegitimate (e.g., fraudulent, fake, illegal, etc.) advertisements or conduct other illegitimate actions. In another example, users can provide their payment information (e.g., credit card information, bank account information) to an online service in order to fund various online activities. However, occasionally, an illegitimate user can attempt to illegitimately gain access to a legitimate user's payment information or otherwise compromise the legitimate user's account with the online service.

Accordingly, when a user of an online service, such as a social networking system, participates in various activities that involve the use of financial instruments compatible or operable with the online service, the financial instruments of the user can sometimes be stolen, illegitimately used, or otherwise compromised. These and other similar concerns can reduce the overall user experience associated with using online services.

SUMMARY

Various embodiments of the present disclosure can include systems, methods, and non-transitory computer readable media configured to receive a set of accounts associated with a specified time frame. One or more features and one or more feature combinations can be analyzed for each account in the set. Feature metrics for the one or more features and the one or more feature combinations can be determined for each account in the set. Threshold values for the feature metrics can be acquired. At least one rule can be implemented based on at least some of the feature metrics and at least some of the threshold values.

In an embodiment, an unidentified account absent from the set of accounts can be received. It can be determined that the unidentified account is associated with the one or more features and the one or more feature combinations. One or more assessment metrics can be calculated based at least in part on the feature metrics determined for each account in the set. The unidentified account can be identified as being illegitimate, based on the at least one rule, when the one or more assessment metrics satisfy the at least some of the threshold values.

In an embodiment, the one or more assessment metrics can be associated with at least one of a ratio of a number of manually disabled new accounts relative to a number of disabled new accounts, a number of new accounts, or a ratio of the number of disabled new accounts relative to the number of new accounts.

In an embodiment, the threshold values for the feature metrics can include a first threshold value, a second threshold value, and a third threshold value. The first threshold value can be associated with the ratio of the number of manually disabled new accounts relative to the number of disabled new accounts. The second threshold value can be associated with the number of new accounts. The third threshold value can be associated with the ratio of the number of disabled new accounts relative to the number of new accounts.

In an embodiment, the first threshold value can correspond to 0.75. In some cases, the second threshold value can correspond to 8. In some instances, the third threshold value can correspond to 0.75.

In an embodiment, the set of accounts can correspond to a set of advertiser accounts.

In an embodiment, the one or more features can be associated with at least one of an advertisement title, an advertisement image, an advertisement landing page identifier, a social networking system identifier for an advertisement landing page component, an advertisement body text portion, an advertisement landing page domain, a source internet protocol (IP), a credit card identification number, a latest administered page name, a campaign name, a user agent, or an advertisement image identifier.

In an embodiment, at least one of the one or more feature combinations can be associated with a default source country, a campaign currency, and a credit card identification number.

In an embodiment, the threshold values for the feature metrics can include a first set of threshold values and a second set of threshold values. In some cases, threshold values in the first set can be higher than threshold values in the second set. In some instances, the first set of threshold values can be associated with automatically disablement. In some cases, the second set of threshold values can be associated with manual review.

In an embodiment, the feature metrics determined for each account in the set can be updated daily.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
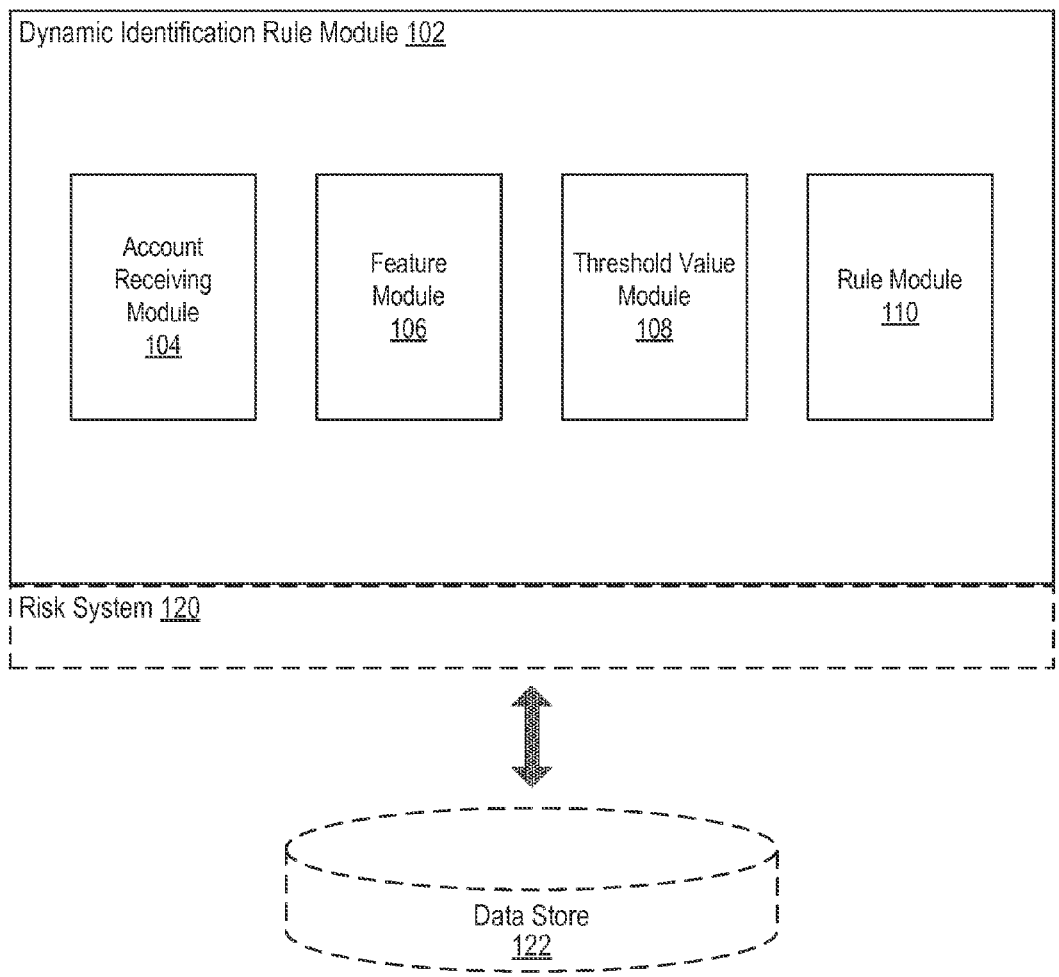
FIG. 1 illustrates an example system including an example dynamic identification rule module configured to facilitate dynamically identifying illegitimate accounts based on rules, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Dynamically Identifying Illegitimate Accounts Based on Rules

People often conduct transactions or engage in activities that involve the use of financial instruments, such as credit cards, bank accounts, electronic or digital payment services, etc. When users of computing devices utilize financial instruments in a networked environment (e.g., Internet, cellular data network, online service, social networking system, etc.), the users must often provide information about their financial instruments. In some cases, illegitimate or fraudulent users can attempt to steal information about the financial instruments of legitimate online service users. In some cases, an illegitimate user can attempt to link a stolen financial instrument with a legitimate user's online service account.

Furthermore, in some instances, illegitimate users can attempt to create accounts with social networking systems or services and utilize those accounts to conduct illegitimate activities within the social networking systems. For example, an illegitimate user can create a plurality of accounts with a social networking system in hopes that at least some accounts will be able to successfully publish one or more illegitimate advertisements.

Conventional approaches to identifying illegitimate accounts (or users, activities, transactions, events, and/or other incidents, etc.) generally utilize rules or policies to target specific illegitimate schemes that have particular trends, patterns, properties, traits, or characteristics in common. However, illegitimate accounts or users can attempt to shift away from those schemes and utilize different schemes, in order to proceed undetected by those rules or policies. As such, conventional approaches can often times be ineffective and inefficient.

Therefore, an improved approach to identifying potentially illegitimate accounts (or users, activities, transactions, events, and/or other incidents, etc.) can be beneficial for addressing or alleviating various concerns associated with conventional approaches. The disclosed technology can dynamically identify illegitimate accounts based on rules. Various embodiments of the present disclosure can receive a set of accounts associated with a specified time frame. One or more features and one or more feature combinations can be analyzed for each account in the set. Feature metrics for the one or more features and the one or more feature combinations can be determined for each account in the set. Threshold values for the feature metrics can be acquired. At least one rule can be implemented based on at least some of the feature metrics and at least some of the threshold values. It is contemplated that there can be many variations and/or other possibilities.

FIG. 1 illustrates an example system 100 including an example dynamic identification rule module 102 configured to facilitate dynamically identifying illegitimate accounts based on rules, according to an embodiment of the present disclosure. As shown in the example of FIG. 1, the dynamic identification rule module 102 can include an account receiving module 104, a feature module 106, a threshold value module 108, and a rule module 110. In some instances, the example system 100 can also include a risk system 120 and at least one data store 122. The components (e.g., modules, elements, etc.) shown in this figure and all figures herein are exemplary only, and other implementations may include additional, fewer, integrated, or different components. Some components may not be shown so as not to obscure relevant details.

In some embodiments, the dynamic identification rule module 102 can be implemented, in part or in whole, using software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the example dynamic identification rule module 102 can be implemented, in part or in whole, as software running on one or more computing devices or systems, such as on a user or client computing device. For example, the dynamic identification rule module 102 can be implemented as or within an application (e.g., app), a program, or an applet, etc., running on a user computing device or client computing system. In another example, the dynamic identification rule module 102 can be implemented using one or more computing devices or systems that include one or more servers, such as network servers or cloud servers. In some cases, the dynamic identification rule module 102 can, in part or in whole, be implemented within or configured to operate with the risk system 120. In some instances, the dynamic identification rule module 102 can, in part or in whole, be implemented within or configured to operate with a social networking system (or service), such as the social networking system 930 of FIG. 9. It should be understood that many variations are possible.

The account receiving module 104 can be configured to facilitate receiving a set of accounts associated with a specified time frame. In some instances, the set of accounts can include online service accounts utilized for advertising at an online service. For example, the set of accounts can include social networking advertiser accounts used for publishing advertisements at the social networking system or service. In some implementations, the account receiving module 104 can communicate and operate with the risk system 120 and/or the at least one data store 122 to acquire or receive the set of accounts associated with the specified time frame. The specified time frame can correspond to various defined time periods, such as a period including the past 90 days or other suitable time frames. In one example, the set of accounts can correspond to all accounts in the risk system 120 and/or the data store 122 over the last 90 days.

The feature module 106 can be configured to facilitate analyzing, for each account in the set, one or more features and one or more feature combinations. The feature module 106 can be further configured to facilitate determining, for each account in the set, feature metrics for the one or more features and the one or more feature combinations. More details regarding the feature module 106 will be provided below with reference to FIG. 2.

The threshold value module 108 can be configured to facilitate acquiring threshold values for the feature metrics. In some implementations, the threshold value module 108 can be configured to acquire or determine the threshold values for the feature metrics, such as by utilizing machine learning or other computer-assisted techniques. In some embodiments, the threshold values can be determined via research, development, and/or experimentation. For example, manual effort can assist in calculating or determining the threshold values, which can be acquired or received by the threshold value module 108. The threshold values for the feature metrics will be discussed in more detail below.

The rule module 110 can be configured to facilitate implementing at least one rule for dynamically identifying accounts as being illegitimate. In some instances, the at least one rule can be based on at least some of the feature metrics and at least some of the threshold values. The rule module 110 will be described in more detail below with reference to FIG. 3.

Furthermore, as shown in FIG. 1, the example system 100 can include the risk system 120. The risk system 120 can be configured to facilitate various tasks and operations associated with managing risk. For example, the risk system 120 can be utilized by an online service. The risk system 120 can generate and/or implement one or more rules (or policies) to identify accounts or activities that are likely to be illegitimate. As discussed, the dynamic identification rule module 102 can be configured to communicate or operate with the risk system 120. In some embodiments, the dynamic identification rule module 102 can be implemented or can reside within the risk system 120. In some instances, the dynamic identification rule module 102 can be implemented separately from the risk system 120, such as in the form of a component, layer, or framework in addition to the risk system 120. It should be appreciated that many variations are possible.

Moreover, the at least one data store 122 can be configured to communicate or operate with the dynamic identification rule module 102 and/or with the risk system 120. The at least one data store 122 can be configured to store and maintain various types of data. In some implementations, the at least one data store 122 can store information associated with the social networking system (e.g., the social networking system 930 of FIG. 9). The information associated with the social networking system can include data about accounts, users, social connections, social interactions, maps, locations, geo-fenced areas, places, events, groups, posts, communications, content, account settings, privacy settings, a social graph, and various other types of data. In some implementations, the at least one data store 122 can store information associated with users, such as user identifiers, user information, user specified settings, content produced by users, and various other types of user data. In some embodiments, the at least one data store 122 can store information associated with the risk system 120, such as data associated with various online service accounts and/or activities. In some embodiments, the at least one data store 122 can be implemented with or within the risk system 120.

In one example, the account receiving module 104 of the dynamic identification rule module 102 can receive, from the risk system 120 and/or the data store 122, a set of accounts over the past 90 days. The dynamic identification rule module 102 can utilize the feature module 106 to access and/or analyze certain features and feature combinations associated with each account in the set of accounts. One of the feature combinations can include, for example, a particular feature combination associated with a default source country, a campaign currency, and a credit card identification number. Many other features and feature combinations can be utilized as well, but are not discussed in this example for the sake of brevity.

Continuing with the example, based on accessing and/or analyzing the particular feature combination, feature metrics for the particular feature combination can be determined. The feature metrics for the particular feature combination can correspond to statistical information or values associated with the particular feature combination. In this example, the feature metrics for the particular feature combination can indicate how many accounts in the set have a particular instance or arrangement of default source country, campaign currency, and credit card identification number. The feature metrics for the particular feature combination can also indicate how many accounts with the particular instance have been disabled in the risk system 120 and how many of the disabled accounts were manually disabled. Based, in part, on the feature metrics, the rule module 110 can implement at least one rule for dynamically identifying accounts as being illegitimate. In some instances, the at least one rule can also be based on at least some threshold values acquired by the threshold value module 108.

In this example, the at least one rule can specify that an unidentified account, associated with the particular instance or arrangement of default source country, campaign currency, and credit card identification number, is to be identified as being illegitimate when certain conditions are met. Such conditions can be met when a number of manually disabled new accounts with the particular instance divided by a number of disabled new accounts with the particular instance at least meets a first threshold value (e.g., 0.75 or other suitable value), when a number of new accounts with the particular instance at least meets a second threshold value (e.g., 8 or other suitable value), and when the number of disabled new accounts with the particular instance divided by a number of new accounts with the particular instance at least meets a third threshold value (e.g., 0.75 or other suitable value).

Accordingly, in this example, when the number of illegitimate accounts having the particular instance increases, the number of manually disabled accounts with the particular instance can also increase, thereby causing the at least one rule to be triggered as the thresholds are satisfied and to identify accounts (including the unidentified account) with the particular instance as being illegitimate. Conversely, when the number of illegitimate accounts having the particular instance decreases, the number of manually disabled accounts can also decrease, thereby causing the threshold values to be unsatisfied and stopping the at least one rule from identifying accounts (including the unidentified account) with the particular instance as being illegitimate. As such, the at least one rule can dynamically identify accounts as being illegitimate.

Figure 2:
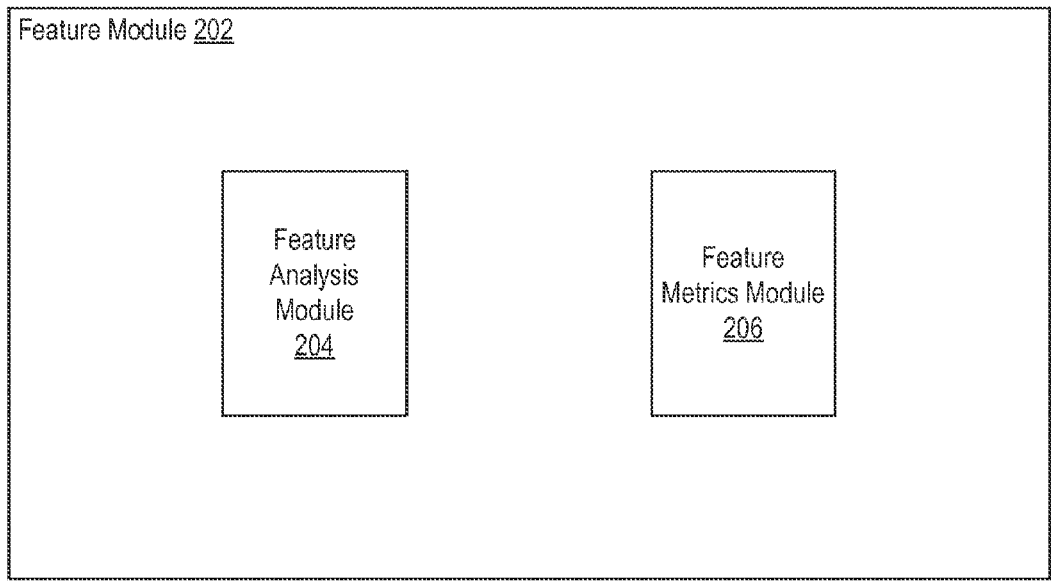
FIG. 2 illustrates an example feature module configured to facilitate dynamically identifying illegitimate accounts based on rules, according to an embodiment of the present disclosure.

FIG. 2 illustrates an example feature module 202 configured to facilitate dynamically identifying illegitimate accounts based on rules, according to an embodiment of the present disclosure. In some embodiments, the feature module 106 of FIG. 1 can be implemented as the example feature module 202. As shown in FIG. 2, the example feature module 202 can include a feature analysis module 204 and a feature metrics module 206.

As discussed above, a set of accounts associated within a specified time frame can be received. The feature analysis module 204 can be configured to access and analyze, for each account in the set, one or more features and one or more feature combinations. In some instances, features can generally refer to properties, traits, characteristics, and/or other information associated with accounts. For example, features can be associated with at least one of an advertisement title, an advertisement image, an advertisement landing page identifier, a social networking system identifier for an advertisement landing page component, an advertisement body text portion, an advertisement landing page domain, a source internet protocol (IP), a credit card identification number, a latest administered page name, a campaign name, a user agent, or an advertisement image identifier. It is contemplated that there can be many variations and other possibilities.

Moreover, feature combinations can generally refer to a collection, set, or other combination of multiple features. The one or more feature combinations can be based on any combination of the one or more features as well as other suitable features. In one example, at least one of the one or more feature combinations can be associated with a default source country, a campaign currency, and a credit card identification number. Again, many variations are possible.

In one example, the feature analysis module 204 can analyze, for a respective account in the received set, a feature combination associated with default source country, campaign currency, and credit card identification number. The feature analysis module 204 can determine that the respective account has a default source country feature associated with Great Britain, a campaign currency feature associated with U.S. Dollars (USD), and a credit card identification number feature associated with 123456.

Moreover, the feature metrics module 206 can be configured to determine, for each account in the received set, feature metrics for the one or more features and the one or more feature combinations. Feature metrics can generally refer to statistics, values, performance metrics, or other similar types of information associated with the one or more features and the one or more feature combinations. In some embodiments, the feature metrics module 206 can determine the feature metrics for a particular feature or feature combination by inputting the particular feature or feature combination into a statistical mechanism which outputs the feature metrics.

In some instances, the feature metrics for a respective particular feature or feature combination can indicate how many accounts in the receive set have the particular feature or feature combination (i.e., a particular feature or feature combination instance). The feature metrics for the particular feature or feature combination can also indicate how many accounts with the particular feature or feature combination have been disabled, as well as how many of the disabled accounts were manually disabled. There can be numerous other possibilities as well. Moreover, in some implementations, the feature metrics determined for each account in the set can be updated daily or at other suitable times.

In some embodiments, the feature metrics for the one or more features and the one or more feature combinations can include, but are not limited to, at least one of a number of old accounts (e.g., over the past 90 days relative to yesterday) associated with the one or more features and the one or more feature combinations, a number of new accounts (e.g., over the past 90 days relative to today) associated with the one or more features and the one or more feature combinations, a difference between the number of old accounts and the number of new accounts, a number of disabled old accounts, a number of disabled new accounts, a difference between the number of disabled old accounts and the number of disabled new accounts, a number of manually disabled old accounts, a number of manually disabled new accounts, a difference between the number of manually disabled old accounts and the number of manually disabled new accounts, a number of old accounts queued (e.g., for manual review), a number of new accounts queued, a difference between the number of old accounts queued and the number of new accounts queued, a number of old accounts automatically actioned (e.g., automatically disabled, blocked, or stopped, etc.), a number of new accounts automatically actioned, or a difference between the number of old accounts automatically actioned and the number of new accounts automatically actioned. It is contemplated that there can be many variations.

Figure 3:
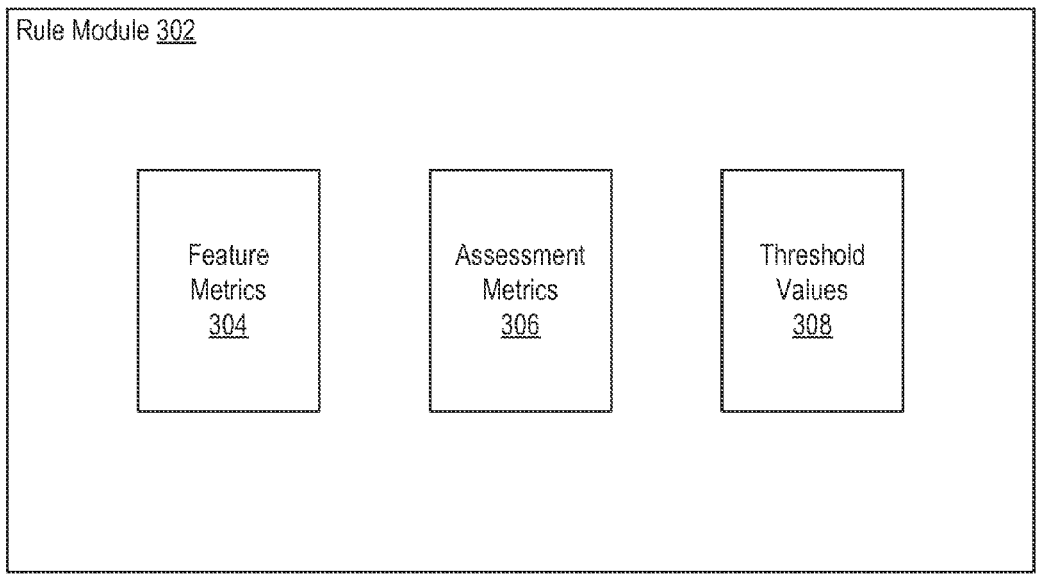
FIG. 3 illustrates an example rule module configured to facilitate dynamically identifying illegitimate accounts based on rules, according to an embodiment of the present disclosure.

FIG. 3 illustrates an example rule module 302 configured to facilitate dynamically identifying illegitimate accounts based on rules, according to an embodiment of the present disclosure. In some embodiments, the rule module 110 of FIG. 1 can be implemented as the example rule module 302. As shown in FIG. 3, the example rule module 302 can utilize feature metrics 304, assessment metrics 306, and threshold values 308.

The rule module 302 can implement at least one rule for dynamically identifying accounts as being illegitimate. In some cases, the at least one rule can be based on at least some feature metrics 304 and at least some threshold values 308. In some implementations, the feature metrics 304 can be determined or acquired by the feature module 106 of FIG. 1, and the threshold values can be determined or acquired by the threshold value module 108 of FIG. 1. In some embodiments, the at least one rule can be generated, developed, and/or created utilizing, at least in part, machine-learning and/or other computer-assisted techniques. In some embodiments, the at least one rule can be generated, developed, and/or created based, at least in part, on manual effort.

As discussed previously, the at least one rule can be based on the feature metrics 304. In some instances, one or more assessment metrics 306 can be determined, calculated, and/or derived from the feature metrics 304 and the at least one rule can be based on the assessment metrics 306. In one example, the at least one rule can be associated with a particular feature combination of default source country, campaign currency, and credit card identification number (i.e., a particular instance, arrangement, or grouping of the particular feature combination). The feature metrics 304 for the particular feature combination can include, but are not limited to, a number of manually disabled new accounts having the particular feature combination, a number of disabled new accounts having the particular feature combination, and a number of new accounts having the particular instance combination. In the example, the one or more assessment metrics 306 can be associated with at least one of a ratio of the number of manually disabled new accounts having the particular feature combination relative to the number of disabled new accounts having the particular feature combination, the quantity or number of new accounts having the particular feature combination, or a ratio of the number of disabled new accounts having the particular feature combination relative to the number of new accounts having the particular feature combination.

As discussed previously, the at least one rule can also be based on the threshold values 308. Continuing with the previous example, the threshold values 308 can include a first threshold value, a second threshold value, and a third threshold value. The first threshold value can be associated with the ratio of the number of manually disabled new accounts relative to the number of disabled new accounts. The second threshold value can be associated with the quantity or number of new accounts. The third threshold value can be associated with the ratio of the number of disabled new accounts relative to the number of new accounts. In this example, the first threshold value can correspond to 0.75. The second threshold value can correspond to 8. The third threshold value can correspond to 0.75. It is understood that many variations and threshold values are possible.

In some embodiments, the threshold values 308 can be determined or otherwise acquired based on computer-assisted techniques and/or manual effort. In some implementations, the threshold values 308 can include a first set of threshold values and a second set of threshold values. The threshold values in the first set can be higher than threshold values in the second set. The first set of threshold values can, for example, be associated with automatically disablement, such that the at least one rule automatically disables accounts with a particular feature or feature combination when the first set of threshold values are met. The second set of threshold values can, for example, be associated with manual review, such that the at least one rule causes accounts with a particular feature or feature combination to be queued for manual review when the second set of threshold values are met but the first set of threshold values are not. Again, many variations are possible.

Figure 4A:
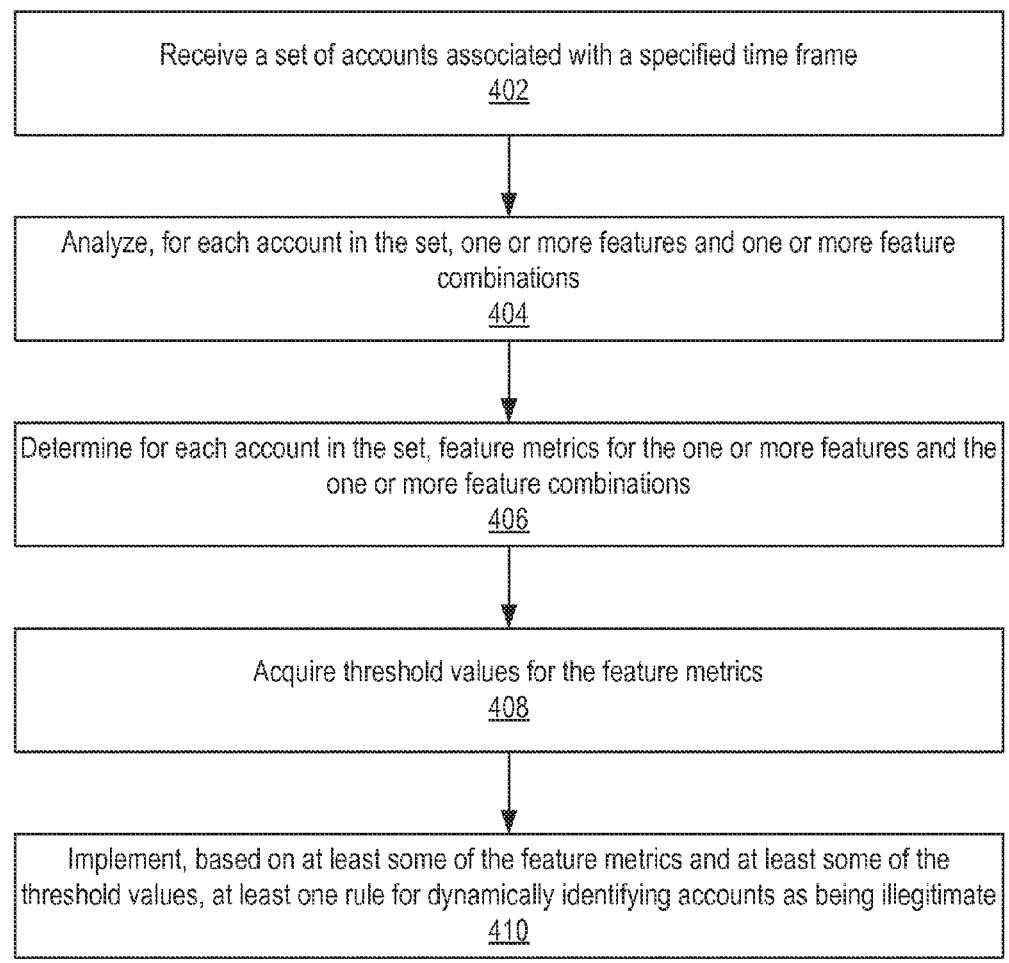
FIG. 4A illustrates an example method associated with dynamically identifying illegitimate accounts based on rules, according to an embodiment of the present disclosure.

FIG. 4A illustrates an example method 400 associated with dynamically identifying illegitimate accounts based on rules, according to an embodiment of the present disclosure. It should be appreciated that there can be additional, fewer, or alternative steps performed in similar or alternative orders, or in parallel, within the scope of the various embodiments unless otherwise stated.

At block 402, the example method 400 can receive a set of accounts associated with a specified time frame. At block 404, the example method 400 can analyze, for each account in the set, one or more features and one or more feature combinations. At block 406, the example method 400 can determine, for each account in the set, feature metrics for the one or more features and the one or more feature combinations. At block 408, the example method 400 can acquire threshold values for the feature metrics. At block 410, the example method 400 can implement at least one rule for dynamically identifying accounts as being illegitimate. In some instances, the at least one rule can be based on at least some of the feature metrics and at least some of the threshold values.

Figure 4B:
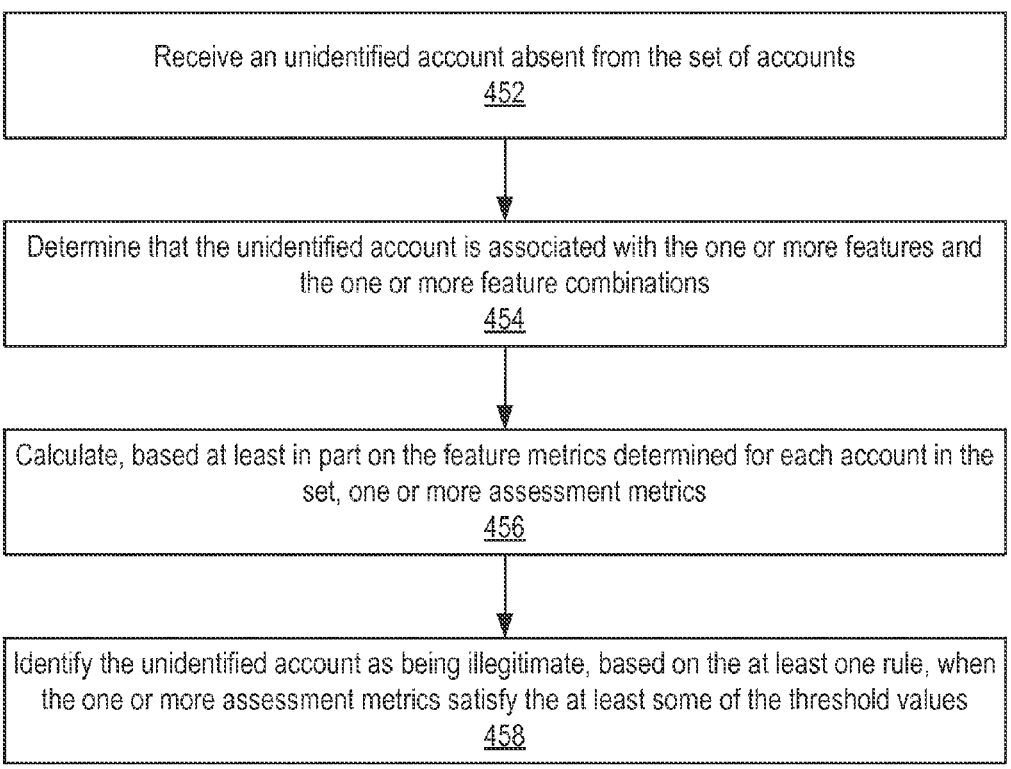
FIG. 4B illustrates an example method associated with dynamically identifying illegitimate accounts based on rules, according to an embodiment of the present disclosure.

FIG. 4B illustrates an example method 450 associated with dynamically identifying illegitimate accounts based on rules, according to an embodiment of the present disclosure. Again, it should be understood that there can be additional, fewer, or alternative steps performed in similar or alternative orders, or in parallel, within the scope of the various embodiments unless otherwise stated.

At block 452, the example method 450 can receive an unidentified account absent from the set of accounts. At block 454, the example method 450 can determine that the unidentified account is associated with the one or more features and the one or more feature combinations. At block 456, the example method 450 can calculate, based at least in part on the feature metrics determined for each account in the set, one or more assessment metrics. At block 458, the example method 450 can identify the unidentified account as being illegitimate, based on the at least one rule, when the one or more assessment metrics satisfy the at least some of the threshold values.

In some embodiments, various embodiments of the present disclosure can be configured to facilitate identifying illegitimate accounts, users, activities, transactions, events, and various other incidents. It is contemplated that there can be many other uses, applications, and/or variations associated with the various embodiments of the present disclosure.

Dynamically Selecting Model Thresholds for Identifying Illegitimate Accounts

In some instances, identifying illegitimate accounts (or users, activities, transactions, events, and/or other incidents, etc.) can utilize one or more models within a risk system. Under conventional approaches, the one or more models within the risk system can be trained based on given, known, or labeled data. The training can define or set model thresholds for the models. A given model can analyze unidentified accounts (or users, activities, transactions, events, and/or other incidents, etc.) and calculate model scores for the unidentified accounts. If the model scores for the unidentified accounts satisfy the model threshold that has been set for the given model, then the unidentified accounts can be identified as being illegitimate and become disabled.

However, under conventional approaches, the model thresholds for triggering identification of accounts as being illegitimate can sometimes be set slightly too high, such that a significant amount of illegitimate accounts are sometimes undetected because they are slightly below the model thresholds. Also, under conventional approaches, the model thresholds for triggering identification of accounts as being illegitimate can sometimes be slightly too low, such that a significant amount of legitimate accounts are sometimes misidentified (i.e., false positive accounts) as being illegitimate or unnecessarily classified as requiring manual review because they are slightly above the model thresholds. Thus, conventional approaches can sometimes be inefficient and insufficiently effective.

Therefore, an improved approach to utilizing models to identify potentially illegitimate accounts can be beneficial for addressing or alleviating various concerns associated with conventional approaches. The disclosed technology can dynamically select model thresholds for identifying illegitimate accounts. Various embodiments of the present disclosure can determine a plurality of model scores for a set of accounts. Each model score in the plurality of model scores can be associated with at least one account in the set of accounts. The plurality of model scores can be ranked in descending order. One or more metrics can be determined for each model score in the plurality of model scores based on information about the at least one account associated with each model score. Specified criteria for selecting a model threshold utilized in identifying illegitimate accounts can be acquired. The specified criteria can be based on at least some of the one or more metrics. The model threshold can be selected as corresponding to a lowest ranked model score that satisfies the specified criteria. It is contemplated that there can be many variations and/or other possibilities.

Figure 5:
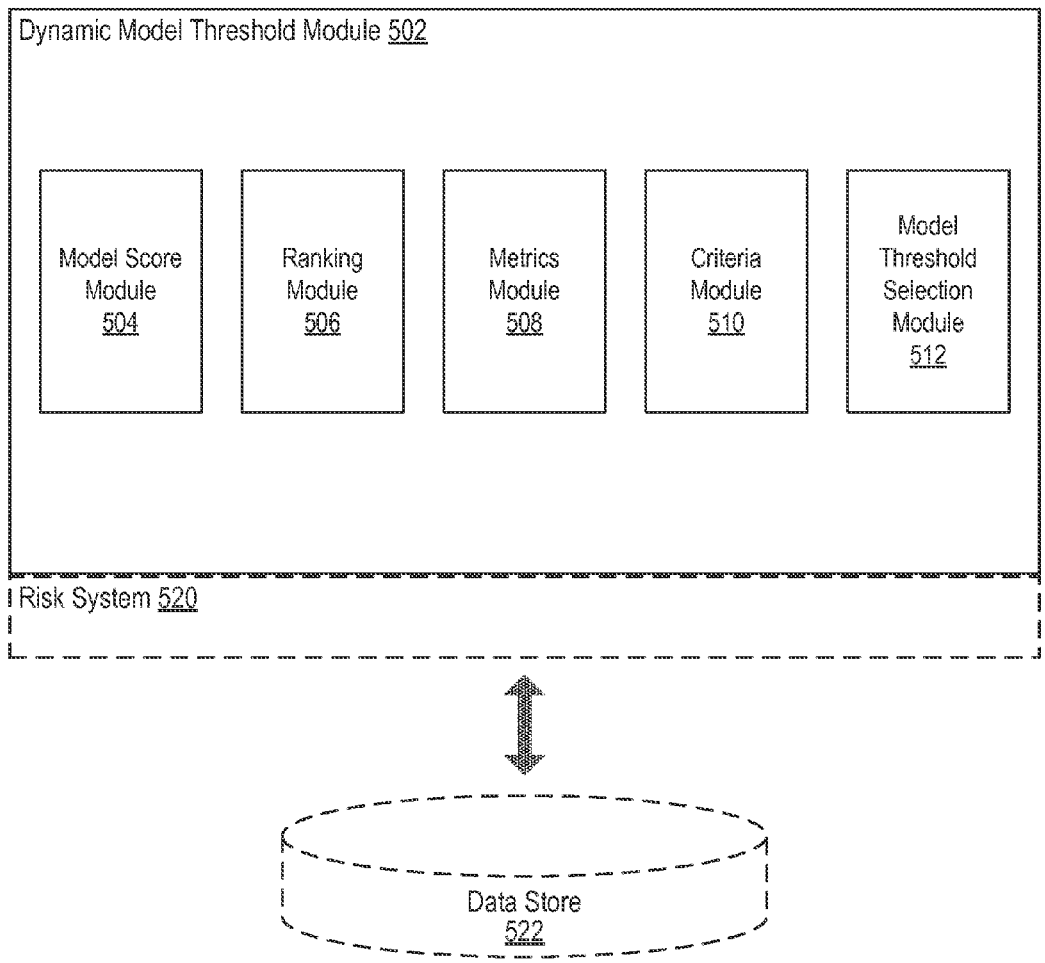
FIG. 5 illustrates an example system including an example dynamic model threshold module configured to facilitate dynamically selecting model thresholds for identifying illegitimate accounts, according to an embodiment of the present disclosure.

FIG. 5 illustrates an example system 500 including an example dynamic model threshold module 502 configured to facilitate dynamically selecting model thresholds for identifying illegitimate accounts, according to an embodiment of the present disclosure. As shown in the example of FIG. 5, the dynamic model threshold module 502 can include a model score module 504, a ranking module 506, a metrics module 508, a criteria module 510, and a selection module 512. In some instances, the example system 500 can also include a risk system 520 and at least one data store 522. In some embodiments, the risk system 520 can be implemented as the risk system 120 of FIG. 1 and the at least one data store 522 can be implemented as the at least one data store 122 or FIG. 1.

In the example of FIG. 5, the dynamic model threshold module 502 can be implemented, in part or in whole, using software, hardware, or any combination thereof. In some cases, the dynamic model threshold module 502 can, in part or in whole, be implemented within or configured to operate with the risk system 520. In some instances, dynamic model threshold module 502 can, in part or in whole, be implemented within or configured to operate with a social networking system (or service), such as the social networking system 930 of FIG. 9. Many variations are possible.

The model score module 502 can be configured to determine a plurality of model scores for a set of accounts. Each model score in the plurality of model scores can be associated with at least one account in the set of accounts. A model score can generally indicate a likelihood that an associated account (e.g., an account having the model score) is an illegitimate account. In some instances, a model score can correspond to a numeric value between 0 and 1, where a higher model score for an account indicates a higher likelihood that the account is illegitimate. In one example, the set of accounts can be accessed, received, or otherwise acquired from the risk system 520 and/or the data store 522. The model score module 502 can determine, calculate, receive, or otherwise acquire a model score for each account in the set of accounts. Occasionally, multiple accounts in the set can be determined to have the same model score. In some implementations, the model score module 502 can utilize one or more models in the risk system 520 to determine the model score for each account.

In some implementations, there can be various models in the risk system 520 for identifying illegitimate accounts. In some cases, the models can correspond to logistic regression models, gradient boosted tree models, and/or other similar models. The models can be trained based on known or training data. The training can produce at least one respective model threshold for each model. In one example, when an account is determined, based on a model, to have a model score surpassing the model threshold for the model, then the account can be identified as being illegitimate. In some cases, a particular model can be designed or intended for, and utilized in, identifying accounts associated with a particular illegitimate scheme. Illegitimate schemes can, for example, include compromised fraud schemes, stolen financial instrument schemes, bank account fraud schemes, failed payment schemes, and/or various other illegal or fraudulent schemes, etc.

The ranking module 506 can be configured to rank the plurality of model scores in descending order. In one example, the plurality of model scores have numeric values between 0 and 1, such that the ranking module 506 can rank the model scores based on their numeric values. In some instances, the ranking module 506 can rank the plurality of model scores by sorting the models scores in descending order based on their values. In one example, each unique model score with a unique value, relative to other values associated with other model scores, is ranked, sorted, or ordered with respect to the other model scores with the other values.

The metrics module 508 can be configured to determine or acquire one or more metrics for each model score in the plurality of model scores based on information about the at least one account associated with each model score. The one or more metrics for each (unique) model score can include, but are not limited to, statistics, properties, characteristics, and/or various other information related to the at least one account associated with each model score. More details regarding the metrics module 508 will be provided below with reference to FIG. 6.

Moreover, the criteria module 510 can be configured to acquire specified criteria for selecting a model threshold utilized in identifying illegitimate accounts. In some instances, the specified criteria can be based on at least some of the one or more metrics. The criteria module 510 will be described in more detail below with reference to FIG. 7.

Furthermore, the selection module 512 can be configured to select the model threshold as corresponding to a lowest ranked model score that satisfies the specified criteria. The selecting of the model threshold can be dynamic, for example, in that the selecting of the model threshold is based on the lowest ranked model score, which in turn is further based on the ranking of the plurality of model scores. As such, when new accounts are present, the ranking of the model scores can change. When the ranking of the model scores changes, the selecting of the model threshold can be adjusted accordingly, thereby resulting in the dynamic selection of the model threshold. Additionally or alternatively, when the specified criteria changes, the selecting of the model threshold can change as well, thereby contributing to the dynamic quality of the selection of the model threshold.

In some embodiments, the selecting of the model threshold can be initiated based on at least one of a specified time frame trigger or feedback information. In one example, the specified time trigger frame can include a daily trigger. The daily trigger can cause the plurality of model scores for the set of accounts to be updated daily. In some cases, the model scores and/or the set of accounts can change from day to day. This can affect, on a daily basis, the ranking of the model scores, the determining of the one or more metrics, and/or the specified criteria. As a result, the selecting of the model threshold can also be updated daily (e.g., dynamically). Other time frame triggers can be utilized as well.

In another example, the feedback information can be associated with at least one of an increase in false positive accounts surpassing an allowable false positive threshold or an increase in illegitimate account leakage surpassing an allowable illegitimate account leakage threshold. In this example, when there are too many (e.g., surpassing the allowable false positive threshold) false positive accounts identified as candidates to be queued for manual review, the model threshold can be dynamically selected or adjusted to be lower, such that the model scores for these false positive accounts fall below the model threshold and thus are not queued for manual review. Also, when there are too many (e.g., surpassing the allowable illegitimate account leakage threshold) undetected illegitimate accounts, the model threshold can be dynamically selected or adjusted to be higher, such that the model scores for these undetected illegitimate accounts can at least meet the model threshold and thus can be identified as being illegitimate (and become automatically disabled, blocked, and/or stopped, etc.). Many variations are possible.

Figure 6:
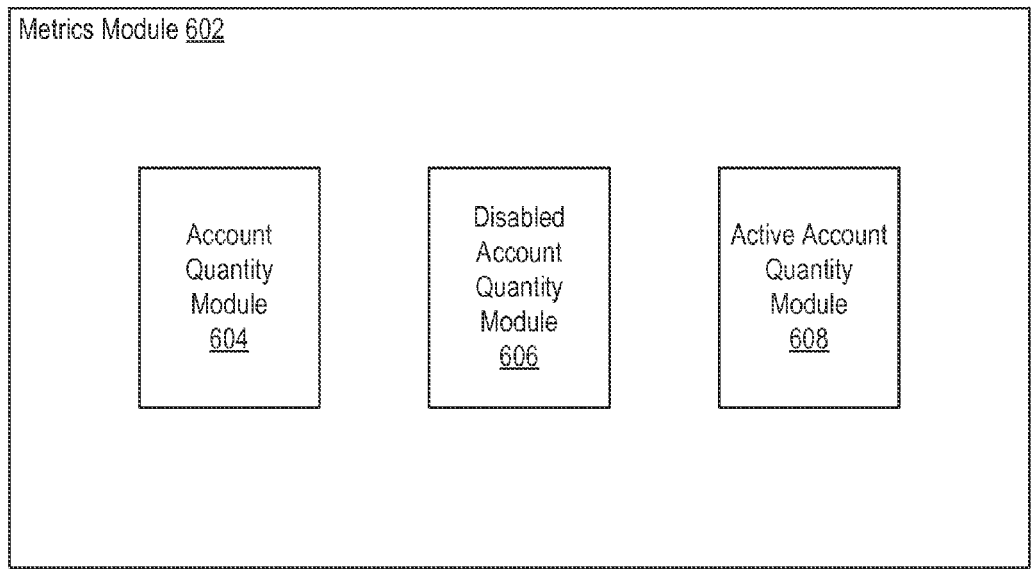
FIG. 6 illustrates an example metrics module configured to facilitate dynamically selecting model thresholds for identifying illegitimate accounts, according to an embodiment of the present disclosure.

FIG. 6 illustrates an example metrics module 602 configured to facilitate dynamically selecting model thresholds for identifying illegitimate accounts, according to an embodiment of the present disclosure. In some embodiments, the metrics module 508 can be implemented as the example metrics module 602. As shown in the example of FIG. 6, the metrics module 602 can include an account quantity module 604, a disabled account quantity module 606, and an active account quantity module 608.

The metrics module 602 can be configured to determine one or more metrics for each model score in a plurality of model scores. In some cases, each model score can be associated with at least one account in a set of accounts. For example, a model in a risk system can be utilized to calculate a model score for each account in the set. In some instances, the determining of the one or more metrics can be based on information about the at least one account associated with each model score.

In some embodiments, the one or more metrics can be associated with a running total quantity of accounts associated with each model score and all higher model scores. The account quantity module 604 can be configured to calculate, determine, or otherwise acquire the running total quantity of accounts associated with each model score and all higher model scores. In one example, if there are 0 accounts having a model score of 1.00, 100 accounts having a model score of 0.99, and 200 accounts having a model score of 0.98, then the account quantity module 604 can determine the running total quantity of accounts associated with the model score of 0.99 (and all higher model scores) as being 100 accounts, and can determine the running total quantity of accounts associated with the model score of 0.98 (and all higher model scores) as being 300 accounts, and so forth.

In some embodiments, the one or more metrics can be associated with a running total quantity of disabled accounts associated with each model score and all higher model scores. The disabled account quantity module 606 can be configured to calculate, determine, or otherwise acquire the running total quantity of disabled accounts associated with each model score and all higher model scores. In one example, if there are 0 disabled accounts having a model score of 1.00, 100 disabled accounts having a model score of 0.99, and 199 disabled accounts having a model score of 0.98, then the disabled account quantity module 606 can determine the running total quantity of disabled accounts associated with the model score of 0.99 (and all higher model scores) as being 100 disabled accounts, and can determine the running total quantity of disabled accounts associated with the model score of 0.98 (and all higher model scores) as being 299 disabled accounts, and so forth.

In some embodiments, the one or more metrics can be associated with a running total quantity of active accounts associated with each model score and all higher model scores. The active account quantity module 608 can be configured to calculate, determine, or otherwise acquire the running total quantity of active accounts associated with each model score and all higher model scores. In one example, if there are 0 active accounts having a model score of 1.00, 0 active accounts having a model score of 0.99, and 1 active account having a model score of 0.98, then the active account quantity module 608 can determine the running total quantity of active accounts associated with the model score of 0.99 (and all higher model scores) as being 0 active accounts, and can determine the running total quantity of active accounts associated with the model score of 0.98 (and all higher model scores) as being 1 active account, and so forth.

Having determined the one or more metrics for each model score, criteria for selecting a model threshold can be based on at least some of the one or more metrics. It is contemplated that there can be many variations, applications, and other possibilities.

Figure 7:
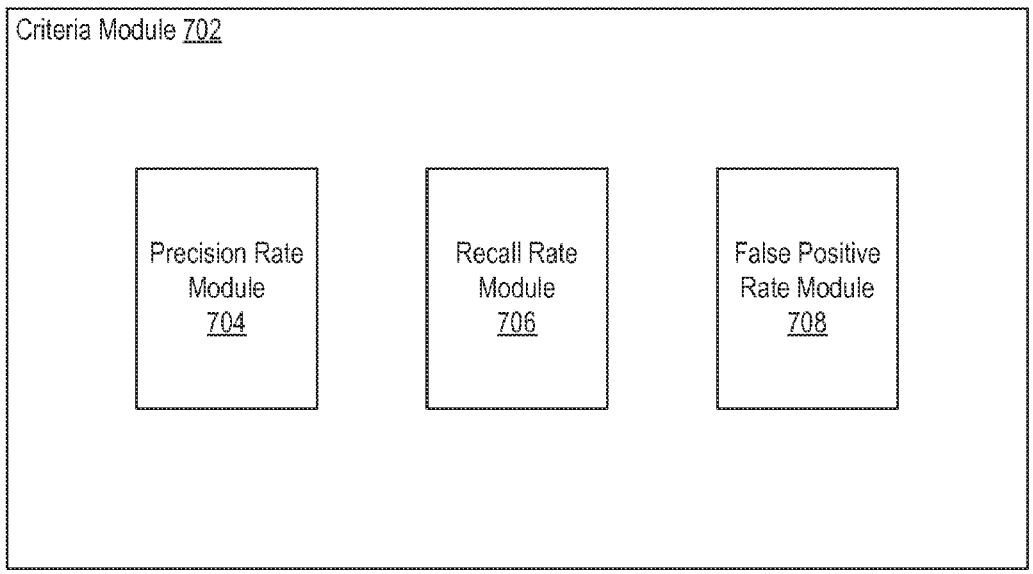
FIG. 7 illustrates an example criteria module configured to facilitate dynamically selecting model thresholds for identifying illegitimate accounts, according to an embodiment of the present disclosure.

FIG. 7 illustrates an example criteria module 702 configured to facilitate dynamically selecting model thresholds for identifying illegitimate accounts, according to an embodiment of the present disclosure. In some embodiments, the criteria module 510 can be implemented as the example criteria module 702. As shown in the example of FIG. 7, the criteria module 702 can include a precision rate module 704, a recall rate module 706, and a false positive rate module 708.

As discussed above, the criteria module 702 can be configured to facilitate acquiring specified criteria for selecting a model threshold utilized in identifying illegitimate accounts. The specified criteria can be based on at least some metrics for model scores. In some embodiments, the specified criteria can be associated with at least one of a precision rate for identifying illegitimate accounts, a recall rate associated with identifying illegitimate accounts, or a false positive rate associated with identifying illegitimate accounts. The precision rate module 704 can determine, calculate, or acquire the precision rate for identifying illegitimate accounts. In some cases, the precision rate for identifying illegitimate accounts can be determined based on a quantity of disabled accounts divided by a quantity of total accounts. The recall rate module 706 can determine, calculate, or acquire the recall rate associated with identifying illegitimate accounts. In some instances, the recall rate associated with identifying illegitimate accounts can be determined based on a quantity of illegitimate accounts at or above a model threshold divided by a quantity of total illegitimate accounts. The false positive rate module 708 can determine, calculate, or acquire the false positive rate associated with identifying illegitimate accounts. In some cases, the false positive rate associated with identifying illegitimate accounts can be determined based on a quantity of active accounts at or above a model threshold divided by a quantity of total active accounts.

Having acquired specified criteria for selecting a model threshold, the model threshold can be selected to satisfy the specified criteria. In one example, the specified criteria can require the false positive rate to have a maximum allowable value of 0.05%. As such, in this example, the model threshold is selected to satisfy the specified criteria requiring the false positive rate to be at most 0.05%. Again, it is contemplated that there can be many variations, applications, and other possibilities.

Figure 8A:
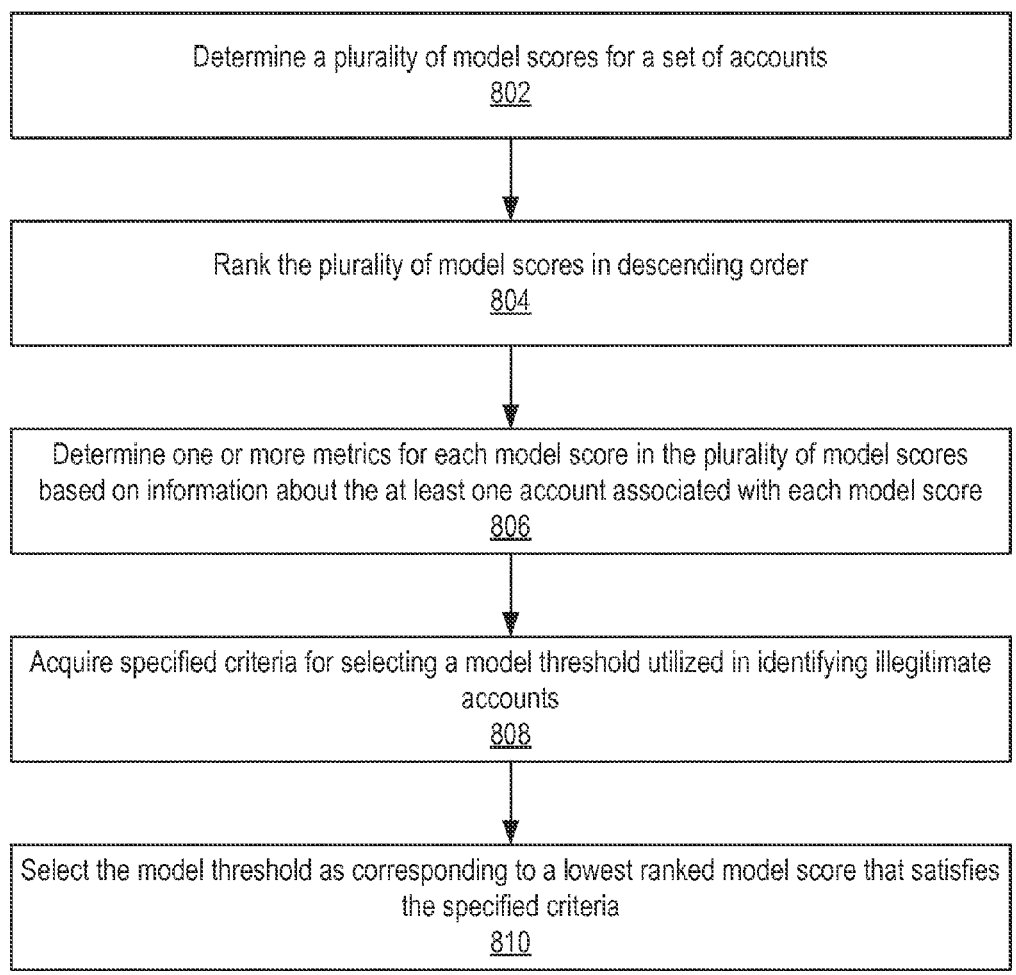
FIG. 8A illustrates an example method associated with dynamically selecting model thresholds for identifying illegitimate accounts, according to an embodiment of the present disclosure.

FIG. 8A illustrates an example method 800 associated with dynamically selecting model thresholds for identifying illegitimate accounts, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can determine a plurality of model scores for a set of accounts. Each model score in the plurality of model scores can be associated with at least one account in the set of accounts. At block 804, the example method 800 can rank the plurality of model scores in descending order. At block 806, the example method 800 can determine one or more metrics for each model score in the plurality of model scores based on information about the at least one account associated with each model score. At block 808, the example method 800 can acquire specified criteria for selecting a model threshold utilized in identifying illegitimate accounts. In some cases, the specified criteria can be based on at least some of the one or more metrics. At block 810, the example method 800 can select the model threshold as corresponding to a lowest ranked model score that satisfies the specified criteria.

Figure 8B:
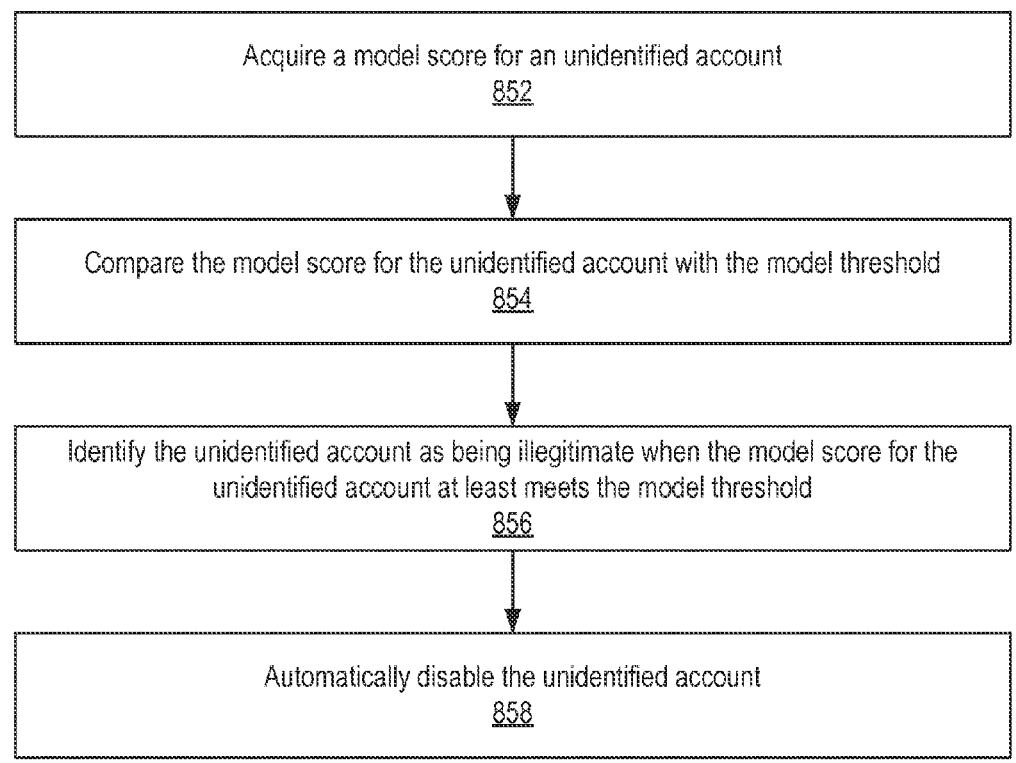
FIG. 8B illustrates an example method associated with dynamically selecting model thresholds for identifying illegitimate accounts, according to an embodiment of the present disclosure.

FIG. 8B illustrates an example method 850 associated with dynamically selecting model thresholds for identifying illegitimate accounts, according to an embodiment of the present disclosure. Again, it should be appreciated that there can be additional, fewer, or alternative steps performed in similar or alternative orders, or in parallel, within the scope of the various embodiments unless otherwise stated.

At block 852, the example method 850 can acquire a model score for an unidentified account. At block 854, the example method 850 can compare the model score for the unidentified account with the model threshold. At block 856, the example method 850 can identify the unidentified account as being illegitimate when the model score for the unidentified account at least meets the model threshold. At block 858, the example method 850 can automatically disable the unidentified account.

In some cases, a model score for an unidentified account can be acquired. The model score for the unidentified account can be compared with a second model threshold that is lower than the model threshold. The unidentified account can be submitted for manual review when the model score for the unidentified account at least meets the second model threshold but fails to at least meet the model threshold.

In some embodiments, the second model threshold can be selected to have a precision rate for identifying illegitimate accounts that is 20% lower than the model threshold.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
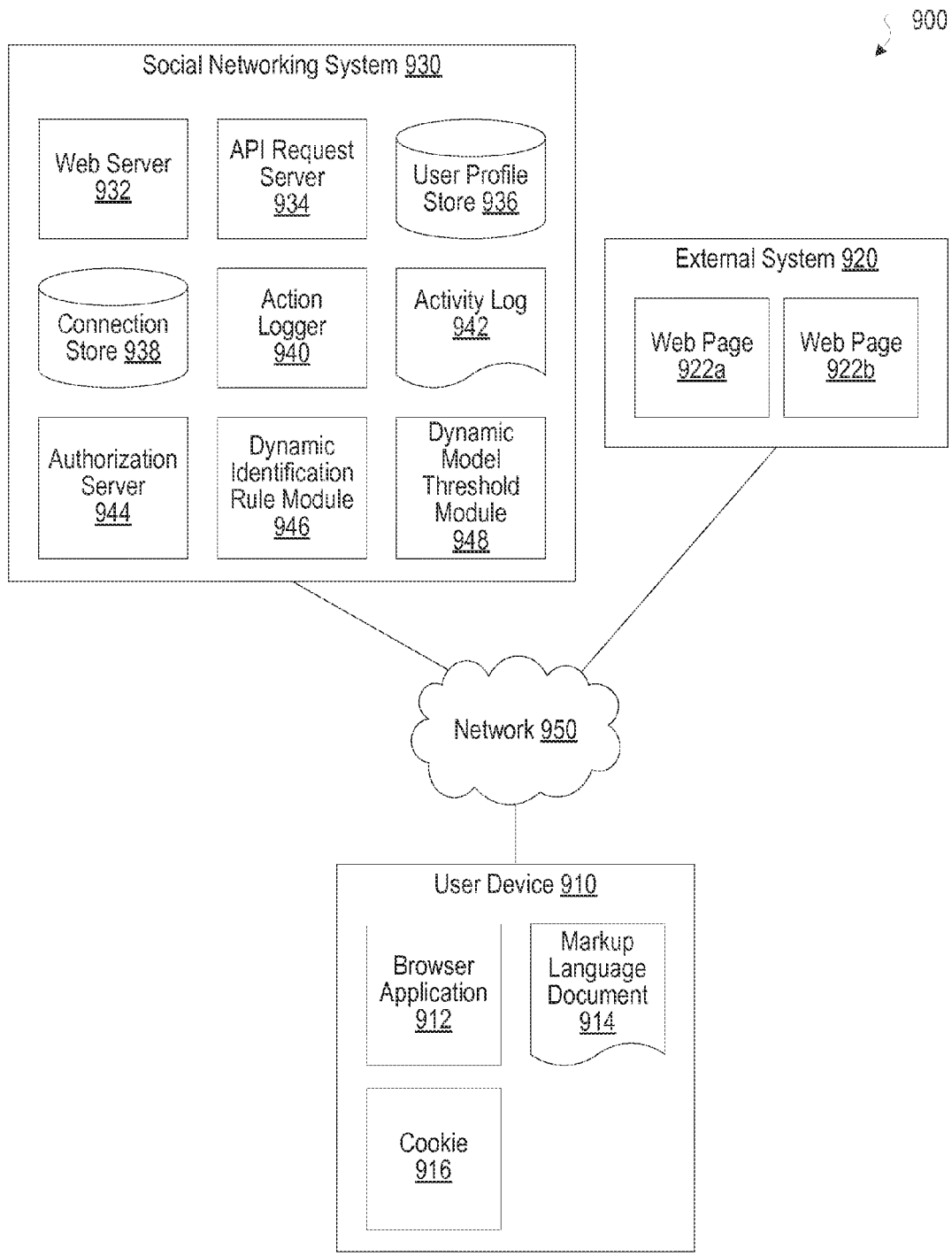
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a dynamic identification rule module 946. The dynamic identification rule module 946 can, for example, be implemented as the dynamic identification rule module 102 of FIG. 1. The dynamic identification rule module 946 can be configured to facilitate receiving a set of accounts associated with a specified time frame. The dynamic identification rule module 946 can also be configured to facilitate analyzing for each account in the set, one or more features and one or more feature combinations. Further, the dynamic identification rule module 946 can be configured to facilitate determining for each account in the set, feature metrics for the one or more features and the one or more feature combinations. Moreover, the dynamic identification rule module 946 can be configured to facilitate acquiring threshold values for the feature metrics. The dynamic identification rule module 946 can also be configured to facilitate implementing the at least one rule being based on at least some of the feature metrics and at least some of the threshold values. Other features of the dynamic identification rule module 946 are discussed herein in connection with the dynamic identification rule module 102 of FIG. 1.

In some embodiments, the social networking system 930 can include a dynamic model threshold module 948. The dynamic model threshold module 948 can, for example, be implemented as the dynamic model threshold module 502 of FIG. 5. The dynamic model threshold module 948 can be configured to facilitate determining a plurality of model scores for a set of accounts. Each model score in the plurality of model scores can be associated with at least one account in the set of accounts. The dynamic model threshold module 948 can also be configured to facilitate ranking the plurality of model scores in descending order. Further, the dynamic model threshold module 948 can be configured to facilitate determining one or more metrics for each model score in the plurality of model scores based on information about the at least one account associated with each model score. Moreover, the dynamic model threshold module 948 can be configured to facilitate acquiring specified criteria for selecting a model threshold utilized in identifying illegitimate accounts. The specified criteria can be based on at least some of the one or more metrics. The dynamic model threshold module 948 can also be configured to facilitate selecting the model threshold as corresponding to a lowest ranked model score that satisfies the specified criteria. Other features of the dynamic model threshold module 948 are discussed herein in connection with the dynamic model threshold module 502 of FIG. 5.

Hardware Implementation

Figure 10:
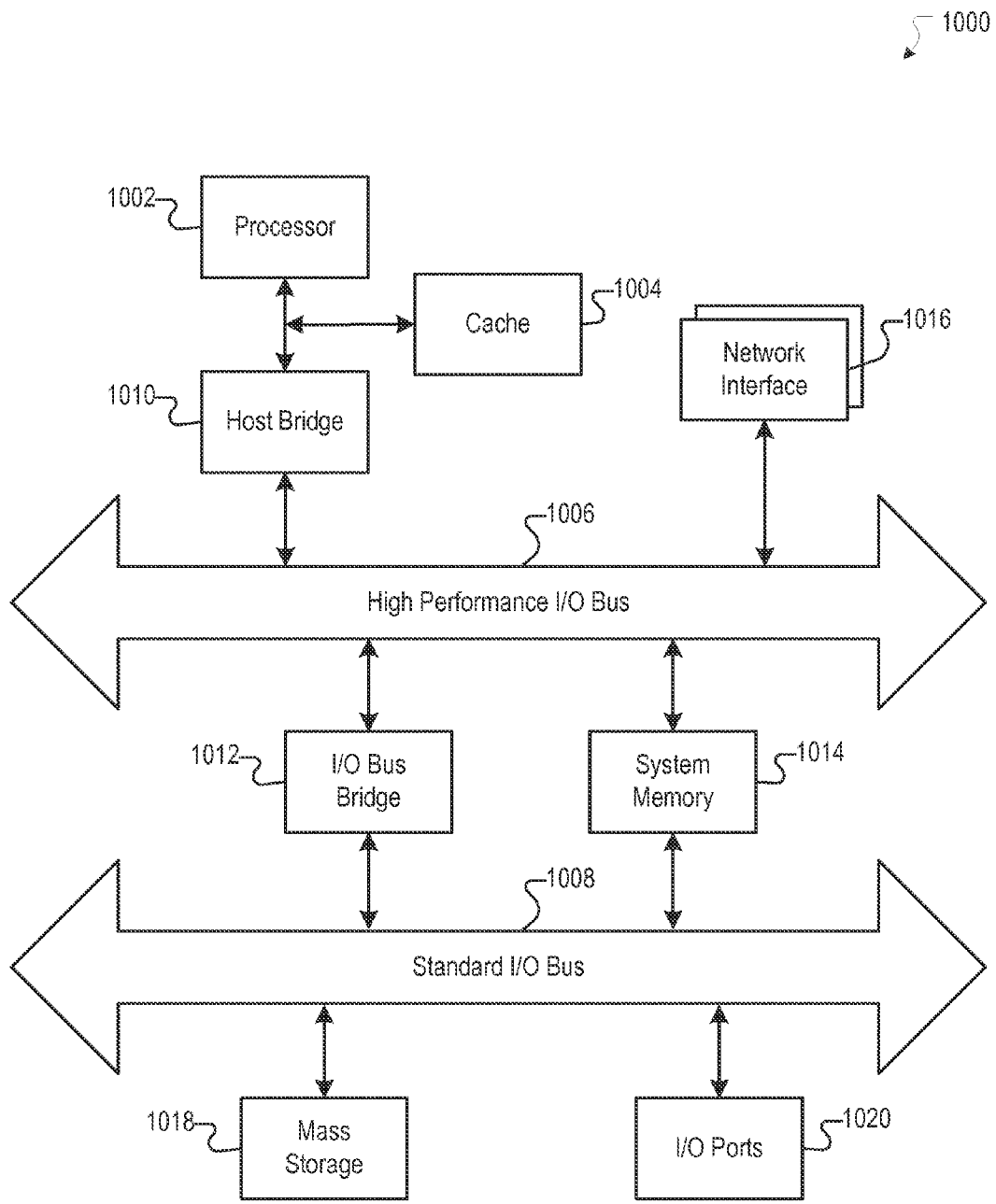
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, a set of accounts associated with a specified time frame;
    analyzing, by the computing system, for each account in the set, one or more features and one or more feature combinations;
    determining, by the computing system, for each account in the set, feature metrics for the one or more features and the one or more feature combinations;
    acquiring, by the computing system, threshold values for the feature metrics;
    implementing, by the computing system, at least one rule for dynamically identifying accounts as being illegitimate, the at least one rule being based on at least some of the feature metrics and at least some of the threshold values;
    receiving, by the computing system, an unidentified account absent from the set of accounts;
    determining, by the computing system, that the unidentified account is associated with the one or more features and the one or more feature combinations;
    calculating, by the computing system, based at least in part on the feature metrics determined for each account in the set, one or more assessment metrics; and
    identifying, by the computing system, the unidentified account as being illegitimate, based on the at least one rule, when the one or more assessment metrics satisfy the at least some of the threshold values.

2. The computer-implemented method of claim 1, wherein the one or more assessment metrics is associated with at least one of a ratio of a number of manually disabled new accounts relative to a number of disabled new accounts, a number of new accounts, or a ratio of the number of disabled new accounts relative to the number of new accounts.

3. The computer-implemented method of claim 2, wherein the threshold values for the feature metrics include a first threshold value, a second threshold value, and a third threshold value, wherein the first threshold value is associated with the ratio of the number of manually disabled new accounts relative to the number of disabled new accounts, wherein the second threshold value is associated with the number of new accounts, and wherein the third threshold value is associated with the ratio of the number of disabled new accounts relative to the number of new accounts.

4. The computer-implemented method of claim 3, wherein the first threshold value corresponds to 0.75, wherein the second threshold value corresponds to 8, and wherein the third threshold value corresponds to 0.75.

5. The computer-implemented method of claim 1, wherein the set of accounts corresponds to a set of advertiser accounts.

6. The computer-implemented method of claim 1, wherein the one or more features are associated with at least one of an advertisement title, an advertisement image, an advertisement landing page identifier, a social networking system identifier for an advertisement landing page component, an advertisement body text portion, an advertisement landing page domain, a source internet protocol (IP), a credit card identification number, a latest administered page name, a campaign name, a user agent, or an advertisement image identifier.

7. The computer-implemented method of claim 1, wherein at least one of the one or more feature combinations is associated with a default source country, a campaign currency, and a credit card identification number.

8. The computer-implemented method of claim 1, wherein the threshold values for the feature metrics includes a first set of threshold values and a second set of threshold values, wherein threshold values in the first set are higher than threshold values in the second set, wherein the first set of threshold values is associated with automatically disablement, and wherein the second set of threshold values is associated with manual review.

9. The computer-implemented method of claim 1, wherein the feature metrics determined for each account in the set are updated daily.

10. A system comprising:
    at least one processor; and
    a memory storing instructions that, when executed by the at least one processor, cause the system to perform:

receiving a set of accounts associated with a specified time frame;

analyzing, for each account in the set, one or more features and one or more feature combinations;

determining, for each account in the set, feature metrics for the one or more features and the one or more feature combinations;

acquiring threshold values for the feature metrics;

implementing at least one rule for dynamically identifying accounts as being illegitimate, the at least one rule being based on at least some of the feature metrics and at least some of the threshold values;

receiving an unidentified account absent from the set of accounts;

determining that the unidentified account is associated with the one or more features and the one or more feature combinations;

calculating, based at least in part on the feature metrics determined for each account in the set, one or more assessment metrics; and identifying the unidentified account as being illegitimate, based on the at least one rule, when the one or more assessment metrics satisfy the at least some of the threshold values.

11. The system of claim 10, wherein the one or more assessment metrics is associated with at least one of a ratio of a number of manually disabled new accounts relative to a number of disabled new accounts, a number of new accounts, or a ratio of the number of disabled new accounts relative to the number of new accounts.

12. The system of claim 11, wherein the threshold values for the feature metrics include a first threshold value, a second threshold value, and a third threshold value, wherein the first threshold value is associated with the ratio of the number of manually disabled new accounts relative to the number of disabled new accounts, wherein the second threshold value is associated with the number of new accounts, and wherein the third threshold value is associated with the ratio of the number of disabled new accounts relative to the number of new accounts.

13. The system of claim 12, wherein the first threshold value corresponds to 0.75, wherein the second threshold value corresponds to 8, and wherein the third threshold value corresponds to 0.75.

14. A non-transitory computer-readable storage medium including instructions that, when executed by at least one processor of a computing system, cause the computing system to perform:

receiving a set of accounts associated with a specified time frame;

analyzing, for each account in the set, one or more features and one or more feature combinations;

determining, for each account in the set, feature metrics for the one or more features and the one or more feature combinations;

acquiring threshold values for the feature metrics;

implementing at least one rule for dynamically identifying accounts as being illegitimate, the at least one rule being based on at least some of the feature metrics and at least some of the threshold values;

receiving an unidentified account absent from the set of accounts;

determining that the unidentified account is associated with the one or more features and the one or more feature combinations;

calculating, based at least in part on the feature metrics determined for each account in the set, one or more assessment metrics; and identifying the unidentified account as being illegitimate, based on the at least one rule, when the one or more assessment metrics satisfy the at least some of the threshold values.

15. The non-transitory computer-readable storage medium of claim 14, wherein the threshold values for the feature metrics include a first threshold value, a second threshold value, and a third threshold value, wherein the first threshold value is associated with the ratio of the number of manually disabled new accounts relative to the number of disabled new accounts, wherein the second threshold value is associated with the number of new accounts, and wherein the third threshold value is associated with the ratio of the number of disabled new accounts relative to the number of new accounts.

16. The non-transitory computer-readable storage medium of claim 15, wherein a first threshold value is associated with the ratio of the number of manually disabled new accounts relative to the number of disabled new accounts, wherein a second threshold value is associated with the number of new accounts, and wherein a third threshold value is associated with the ratio of the number of disabled new accounts relative to the number of new accounts.

17. The non-transitory computer-readable storage medium of claim 16, wherein the first threshold value corresponds to 0.75, wherein the second threshold value corresponds to 8, and wherein the third threshold value corresponds to 0.75.

* * * * *